United States Patent
Elmer et al.

(10) Patent No.: US 11,095,134 B2
(45) Date of Patent: Aug. 17, 2021

(54) METHOD OF PRODUCING A MODULAR BATTERY STORAGE SYSTEM, MODULAR BATTERY STORAGE SYSTEM, AND BATTERY MANAGEMENT SYSTEM THEREFOR

(71) Applicant: VARTA Microbattery GmbH, Ellwangen Jagst (DE)

(72) Inventors: Martin Elmer, Ellwangen (DE); Alexander Hirnet, Oberkochen (DE); Dieter Kloos, Fichtenau (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 211 days.

(21) Appl. No.: 16/480,927

(22) PCT Filed: Jan. 9, 2018

(86) PCT No.: PCT/EP2018/050466
§ 371 (c)(1),
(2) Date: Jul. 25, 2019

(87) PCT Pub. No.: WO2018/162122
PCT Pub. Date: Sep. 13, 2018

(65) Prior Publication Data
US 2019/0393703 A1    Dec. 26, 2019

(30) Foreign Application Priority Data
Mar. 10, 2017 (EP) .................................. 17160379

(51) Int. Cl.
*H02J 7/00* (2006.01)
*H01G 11/06* (2013.01)
(Continued)

(52) U.S. Cl.
CPC ............ *H02J 7/0024* (2013.01); *H01G 11/06* (2013.01); *H01G 11/08* (2013.01); *H01G 11/30* (2013.01);
(Continued)

(58) Field of Classification Search
USPC .................. 320/107, 108, 132, 134, 136
See application file for complete search history.

(56) References Cited

U.S. PATENT DOCUMENTS 9,343,216 B2 *   5/2016  Robertson ............. H01F 7/1615
10,177,682 B2    1/2019  Mondal et al.
(Continued)

FOREIGN PATENT DOCUMENTS

DE    10 2015 205 267 A1    9/2016

OTHER PUBLICATIONS

Singer, A., et al, "A Disruptive Approach: Highly Efficient< Modular Energy Storage Systems by Greater Use of Software and Open Hardware," *VDE Kongree 2016: Internet der Dinge—Technologen Anwendungen, Perspektiven: pp. 1-6*, Nov. 7-8, 2016, Mannheim, Germany, with machine translation.
(Continued)

*Primary Examiner* — Brian Ngo
(74) *Attorney, Agent, or Firm* — DLA Piper LLP (US)

(57) ABSTRACT

A modular battery storage system includes energy storage modules. A switch is assigned to individual energy storage modules, by which the respective energy storage module can be activated and deactivated. The energy storage modules can connect to one another by the switches such that the individual voltages of activated energy storage modules can be added up to form a total voltage. A method of operating the battery storage system ascertains at least one power value for each of the energy storage modules, the power value being characteristic of the power capacity of the
(Continued)

energy storage module. A total voltage is generated by at least two energy storage modules being activated with a time overlap but over activation periods of different length. One of the activation periods of different length is assigned to each of the at least two energy storage modules depending on the ascertained at least one power value.

13 Claims, 1 Drawing Sheet

(51) Int. Cl.
| | |
|---|---|
| H01G 11/08 | (2013.01) |
| H01G 11/30 | (2013.01) |
| H01G 11/46 | (2013.01) |
| H01M 10/0525 | (2010.01) |
| H01M 10/06 | (2006.01) |
| H01M 10/34 | (2006.01) |
| H01M 10/42 | (2006.01) |
| H01M 10/48 | (2006.01) |
| H02J 7/34 | (2006.01) |

(52) U.S. Cl.
CPC ........ *H01G 11/46* (2013.01); *H01M 10/0525* (2013.01); *H01M 10/06* (2013.01); *H01M 10/345* (2013.01); *H01M 10/425* (2013.01); *H01M 10/482* (2013.01); *H02J 7/0021* (2013.01); *H01M 2010/4271* (2013.01); *H02J 7/345* (2013.01)

(56) References Cited

U.S. PATENT DOCUMENTS

| | | |
|---|---|---|
| 2011/0198936 A1 | 8/2011 | Graovac et al. |
| 2013/0285612 A1* | 10/2013 | Okuda ................ H02J 7/0068 320/126 |
| 2016/0079788 A1* | 3/2016 | Amasaki ............ G01R 31/3842 320/136 |
| 2016/0181950 A1* | 6/2016 | Yoscovich .......... H02M 7/4837 363/131 |
| 2017/0123010 A1* | 5/2017 | Sekiguchi ............. H02J 7/0021 |

OTHER PUBLICATIONS

Tolbert, Leon M. et al. "Multilevel Converters for Large Electric Drives," *IEEE Transactions on Industry Applications*. 35(1): pp. 36-44. Jan./Feb. 1999. https://www.academia.edu/2938840/Multilevel_converters_for_large_electric_drives.

\* cited by examiner

METHOD OF PRODUCING A MODULAR BATTERY STORAGE SYSTEM, MODULAR BATTERY STORAGE SYSTEM, AND BATTERY MANAGEMENT SYSTEM THEREFOR

TECHNICAL FIELD

This disclosure relates to a method of operating a modular battery storage system, a battery storage system, and a battery management system therefor.

BACKGROUND

A modular battery storage system comprises a group of n energy storage modules, wherein n is at least 2. The energy storage modules are of rechargeable design. The energy storage modules generally connect to one another by parallel and/or series interconnection within a battery storage system. The energy storage modules may be individual electrochemical cells or assemblies comprising two or more cells of this kind. Individual electrochemical cells can, in turn, connect to one another by parallel and/or series interconnection.

It is known that a battery storage system is a DC source. However, battery storage systems can also be connected to an AC supply grid with the aid of a multi-level converter. In converters of that kind, the voltages of individual energy storage modules are added up with a time delay for periods of different length. When the voltages of the individual energy storage modules are small enough in relation to the added-up total voltage, sinusoidal voltage profiles, for example, can be generated to good approximation.

As is known, information about the current residual capacity (state of charge, for short: SOC) and the maximum available capacity (state of health, for short: SOH) of the energy storage modules that make up the battery storage system is required for reliable operation of a battery storage system. One potential problem is that SOC and SOH of individual energy storage modules in a battery storage system can vary to a very great extent, for example, as a result of different rates of ageing. In general, the energy storage modules with the worst power values determine the overall performance of a battery storage system.

To ensure optimum functioning of the multi-level converter, it should be ensured that all of the energy storage modules that can be switched by the converter differ as little as possible in respect of their power values. This is possible with the aid of so-called balancing systems that perform charge and/or voltage balancing between energy storage modules with unequal states of charge and/or voltage. However, balancing systems of this kind are not cost-effective to implement since the associated hardware and software requirement is considerable.

It could therefore be helpful to provide a means that allows battery storage systems to connect to an AC supply grid while avoiding or reducing problems.

SUMMARY

We provide a method of operating a modular battery storage system consisting of a group of n rechargeable energy storage modules, including assigning a switch to each individual n energy storage modules by which switch the respective energy storage module can be activated and deactivated, connecting the n energy storage modules to one another by the switches such that individual voltages $U_{individual}$ of activated energy storage modules can be added up to form a total voltage $U_{total}$, wherein a group of n energy storage modules includes energy storage modules of different types, ascertaining at least one power value for each of the n energy storage modules, producing a total voltage $U_{tot}(t)$ that changes over time by at least two energy storage modules from the group being activated with a time overlap, but over activation periods of different length, and assigning one of the activation periods of different length to each of the at least two energy storage modules depending on the ascertained at least one power value.

We also provide a battery management system for a modular battery storage system consisting of a group of n rechargeable energy storage modules, including a switch for each of individual n energy storage modules by which switch the respective energy storage module can be activated and deactivated, wherein the switches are designed and connected to one another such that individual voltages $U_{individual}$ of activated energy storage modules can be added up to form a total voltage $U_{total}$, a test device by which at least one power value can be ascertained for each of the n energy storage modules, the power value being characteristic of the power capacity of the energy storage module, and a control device by which at least two of the energy storage modules from the group can be activated with a time overlap but over activation periods of different length by the respectively associated switches to generate a total voltage $U_{tot}(t)$ which changes over time, wherein the control device assigns one of the activation periods of different length to each of the at least two energy storage modules depending on the ascertained at least one power value.

DETAILED DESCRIPTION

Figure 1:
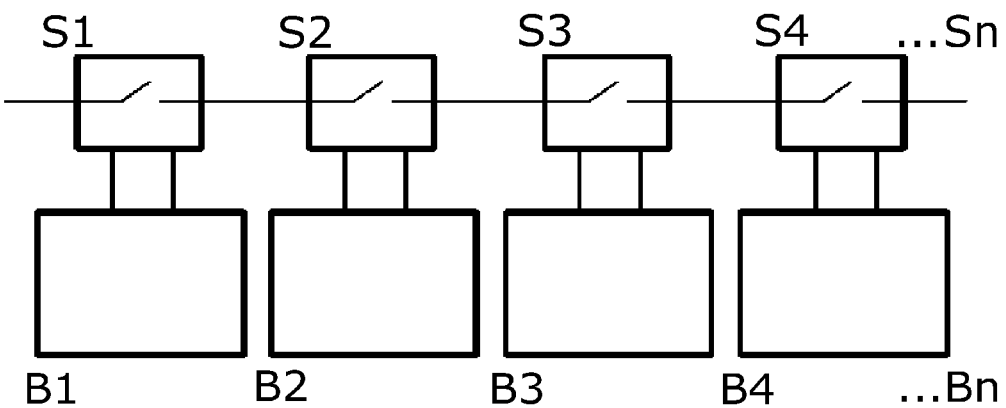
FIG. 1 shows, for illustration purposes, a circuit configuration comprising n energy storage modules each connected to a switch (schematic illustration).

Our method operates a modular battery storage system comprising a group of n rechargeable energy storage modules, wherein
  a switch is assigned to each of the individual n energy storage modules by which switch the respective energy storage module can be activated and deactivated, and
  the n energy storage modules connect to one another such that the individual voltages $U_{individual}$ of activated energy storage modules can be added up to form a total voltage $U_{total}$.

Possible configurations of energy storage modules of modular battery storage systems are described at the outset. The described configurations are also preferred within the scope of the method.

Energy storage modules that can be used particularly preferably comprise electrochemical cells, in particular based on lithium-ion technology or based on nickel-metal hydride technology. However, capacitors can also be used in particular instances below.

The energy storage modules that make up the battery storage system can all have the same individual voltages $U_{individual}$. However, this does not always have to be true. On the contrary, it may even be preferred to install energy storage modules with different individual voltages $U_{individual}$ within the same system. This specifically increases the variants of the total voltage $U_{total}$ that can be provided.

The switches are preferably designed such that the respectively assigned energy storage modules can also be activated with a reversed polarity. As a result, the variants of the total voltage $U_{total}$ that can be provided are increased, in particular when energy storage modules with different individual voltages $U_{individual}$ are installed within the same system at the same time. The individual voltage $U_{individual}$ of an energy storage module activated with reversed polarity specifically makes a negative contribution to the total voltage $U_{total}$.

When one of the n energy storage modules is deactivated, it makes no contribution to the total voltage $U_{total}$. Particularly preferably, the switches are able to bridge the energy storage module which is respectively associated with it, as required. Bridged deactivated energy storage modules are no longer electrically connected to the further energy storage modules of the group.

The method comprises:
At least one power value is ascertained for each of the n energy storage modules.
A total voltage $U_{tot}(t)$ that changes over time is produced by way of at least two energy storage modules from the group being activated with a time overlap but over activation periods of different length.
One of the activation periods of different length is assigned to each of the at least two energy storage modules depending on the ascertained at least one power parameter.

In other words, an assignment as to which of the energy storage modules are activated only for a short duration (a short activation period) and which of the energy storage modules are activated for a longer duration (a longer activation period) is therefore performed depending on the at least one power parameter.

The power value is a state value characteristic of the power capacity of an energy storage module. In particular, the power value may be the current SOC or the current SOH of the respective energy storage module at the time at which it was ascertained. However, the at least one power value may also be a value correlated with the current SOC and/or the current SOH of the respective energy storage module.

There are a plurality of known procedures to determine the SOC. For example, conclusions can be drawn about the current SOC value when measuring a discharge voltage with the aid of known discharge curves. However, the selected method of determining the SOC is secondary. It is only important for the ascertained power values to be comparable to one another, that is to say to be obtained in a comparable manner so that the power capacity of the energy storage modules can be compared on the basis of the values.

There are also a plurality of known procedures to determine the SOH. By way of example, the internal resistance of an energy storage module is characteristic of the SOH of the energy storage module. A reference value for the internal resistance can be determined, for example, when an energy storage module is put into operation under defined conditions (temperature, state of charge, discharge current, discharge duration and the like). Conclusions can be drawn about the SOH on the basis of the change in the internal resistance (measured under the same defined conditions). However, the possibly selected method of determining the SOH is also secondary. It is only important in this example too for the ascertained power values for the energy storage modules of the energy storage system to be comparable to one another, that is to say obtained in a comparable manner so that the power capacity of the energy storage modules can be compared on the basis of the obtained values.

In general, the SOH of an energy storage module—apart from formation cycles when it is put into operation—do not significantly change between immediately successive charging and discharging cycles. When the at least one power value is the current SOH or else a value correlated with the current SOH, it is therefore generally sufficient to determine the power value only at intervals, for example, at intervals of 10 charging and discharging cycles. The determined value can then be stored and, until it is updated, used for assigning the at least two energy storage modules to the activation periods of different length.

However, it is generally expedient to determine the current SOH or else a value correlated with the current SOH immediately before the assignment since the SOH can change to a significant extent very quickly.

The total voltage $U_{tot}(t)$, which changes over time, can be generated with fundamentally arbitrary voltage profiles. For example, a sawtooth voltage can be produced to similarly good approximation to a delta voltage.

Particularly preferably, $U_{tot}(t)$ is, in particular, a voltage with a sinusoidal voltage profile, as was already mentioned at the outset. Preferably, the method can therefore be a discharge method in which current is fed from a DC voltage source to an AC supply grid with the conversion from DC voltage to AC voltage.

A modular battery storage system can comprise a very large number of energy storage modules. In general, the variable n is a value of 2 to 100 000, preferably of 2 to 10 000, particularly preferably 2 to 1000. Within these ranges, the variable n is further preferably a value of 5 to 100, particularly preferably 5 to 20, in particular of from 7 to 10.

Preferably, the method has at least one of the following additional steps, particularly preferably all three of the following additional steps:
The ascertained power values for each of the n energy storage modules are stored in a data memory so that it is possible to sort the n energy storage modules in accordance with their power capacity.
The assignment of the energy storage modules to the activation periods of different length takes place on the basis of the power values which are stored in the data memory.
Longer activation periods are assigned to energy storage modules with a comparatively high power capacity than energy storage modules with a comparatively low power capacity.

In general, the activation periods are correlated with the ascertained power capacities of the individual modules. When, for example, the at least one power value is the current SOH, the energy storage modules can be sorted in accordance with a rising SOH. The largest SOH value then identifies the largest power capacity, and the smallest SOH value identifies the lowest power capacity. It is preferred for the longest activation period to be assigned to the energy storage module with the largest SOH, but for the shortest activation period to be assigned to the energy storage module with the smallest SOH.

The consequence of this is that more powerful energy storage modules are subjected to greater loading than less powerful energy storage modules during operation. Due to the different loadings, the power capacities of the energy storage modules are again balanced with one another over the long term since modules subjected to greater loading on average age more quickly than modules subjected to lower loading. The method therefore indirectly ensures symmetrization of the energy storage modules and therefore has a similar effect to the balancing systems mentioned at the outset.

Aged energy storage modules from the field of electromobility have the largest variance in capacity. According to the method, aged energy storage modules of this kind can also be operated jointly in a battery storage system without having to be preselected. When an energy storage module has reached the end of its service life, it can be readily replaced by a replacement module without complicated preparatory measures (matching or the like) being required in the process. Energy storage modules that are as good as new can also be connected and operated irrespective of their initial capacity and any possible production variation without preparatory measures.

The useful life of the energy storage modules used in a battery storage system which is operated is extended overall, this being accompanied by both an ecological and an economic advantage.

Particularly preferably, the method has at least one of the following additional steps, particularly preferably all five of the additional steps explained below:

The number m of energy storage modules required to generate a peak voltage of $U_{tot}(t)$ is ascertained.

The m energy storage modules are selected from among the available n energy storage modules.

The time intervals in which and the activation period over which the m energy storage modules are to be activated are defined to generate a desired voltage profile of $U_{tot}(t)$.

The selected m energy storage modules are switched into an order in which the two sorting criteria either both increase or both decrease in the same direction, taking into account the sorting criteria "power capacity" and "length of the activation periods as signed to them".

The m energy storage modules can be sorted in accordance with their power capacity, and the activation periods can be sorted in accordance with their length. The activation periods are assigned to the m energy storage modules. In this example, the assignment takes place such that, after the assignment, sorting of the energy storage modules in accordance with their power capacity and in accordance with the length of the activation periods assigned to them leads to the same result. Therefore, when sorting in accordance with increasing power capacity, an order in which the longest activation period is assigned to the most powerful module, the second longest activation period is assigned to the second most powerful module, the third longest activation period is assigned to the third most powerful module and the like is produced.

The m energy storage modules are activated in this order and at the defined time intervals.

The peak voltage is the largest magnitude of the instantaneous value of a periodically changing voltage. In the sinusoidal voltage profile, the peak voltage corresponds to the amplitude of the sinusoidal oscillation.

In the simplest example (when all of the energy storage modules of the modular battery storage system have the same individual voltage $U_{individual}$), m is ascertained by the value of the peak voltage being divided by the individual voltage $U_{individual}$ supplied by a single energy storage module.

Particularly preferably, the modular battery storage system comprises more energy storage modules than are required to generate the peak voltage. In summary, n>m with preference. The selection of m energy storage modules can take place, for example, on the basis of the available data relating to the power capacity of the modules. For example, the m most powerful modules can always be selected.

Provision can also particularly advantageously be made for defective energy storage modules to not be taken into account during selection. To this end, for example, a power threshold value can be defined for each of the n energy storage modules, an energy storage module being deactivated when the power threshold value is undershot.

Provision can optionally be made for the deactivation to trigger a signal or a message, which indicates the deactivation and/or the need for a replacement, as a result of the undershooting. The defective energy storage module can be exchanged while operation is ongoing in principle. The method does not have to be stopped for this purpose. To this end, the switches assigned to the energy storage modules have the abovementioned bridging option when the energy storage modules are no longer electrically connected to further energy storage modules.

Particularly preferably, the method has at least one of the following additional features and/or one of the following additional steps:

The desired voltage profile is sinusoidal.

The energy storage module with the highest power capacity is activated first and that with the lowest power capacity is activated last.

The energy storage module with the highest power capacity is activated over the longest activation period and the energy storage module with the lowest power capacity is activated over the shortest activation period.

To generate a sinusoidal half-wave, the energy storage module to which the longest activation period has been assigned has to be activated first and deactivated last. In contrast, the energy storage module to which the shortest activation period has been assigned has to be activated last and deactivated first. The energy storage module to which the longest activation period has been assigned has a comparatively high power capacity. In contrast, the energy storage module to which the shortest activation period has been assigned can have a comparatively low power capacity.

Particularly preferably, the method has at least one of the following additional features:

The group of the n energy storage modules comprises only energy storage modules of the lithium-ion type.

The group of the n energy storage modules comprises only energy storage modules of the nickel-metal hydride type.

The group of the n energy storage modules comprises different types of energy storage modules.

The group of the n energy storage modules comprises at least one energy storage module with a cathode based on LFP (lithium iron phosphate).

The group of the n energy storage modules comprises at least one energy storage module with a cathode based on NMC (lithium nickel manganese cobalt oxide).

The group of the n energy storage modules comprises at least one energy storage module with a cathode based on LTO (lithium titanate).

The group of the n energy storage modules comprises at least one energy storage module with a cathode based on NCA (lithium nickel cobalt aluminum oxide).

The group of the n energy storage modules comprises at least one energy storage module of the $Pb/PbO_2$ type.

According to the method, energy storage modules of different types can readily connect to one another in one battery storage system. The strengths of individual types can be utilized in a targeted manner Different energy storage modules can be actuated depending on requirements. For example, energy storage modules with a cathode based on LTO are particularly suitable for collecting high load peaks.

According to the method, it is even possible, in principle, to connect energy storage modules of the nickel-metal hydride type and energy storage modules of the lithium-ion type to one another in one battery storage system.

Energy storage modules of the $Pb/PbO_2$ type are conventionally used with a sulfuric acid electrolyte as individual cells of a lead-acid rechargeable battery. Particular preference may be given to the at least one energy storage module of the $Pb/PbO_2$ type being connected to energy storage modules of the lithium-ion type in one battery storage system. Energy storage modules of the $Pb/PbO_2$ type are particularly well suited for use at peak tips.

In line with these examples, the method has at least one of the following features:

The energy storage modules of different types preferably have different individual voltages $U_{individual}$.

The group of n energy storage modules can therefore comprise, for example, energy storage modules with a rated voltage of 1.2 V (as, for example, an energy storage module of the nickel-metal hydride type has) combined with energy storage modules with a rated voltage of 2 V (for example, an energy storage module of the $Pb/PbO_2$ type) or with a capacitor, for example, with a rated voltage of 4 V.

The energy storage modules of different types preferably comprise at least one energy storage module which is a capacitor.

The energy storage modules of different types preferably comprise at least two energy storage modules with different rated voltages, each of the energy storage modules being a capacitor.

The energy storage modules of different types preferably comprise at least one energy storage module that stores electrical energy on an electrochemical basis.

The energy storage modules of different types preferably comprise at least two energy storage modules that store electrical energy on an electrochemical basis and differ from one another in respect of their rated voltage.

The energy storage modules of different types preferably comprise at least one energy storage module that is a capacitor and at least one energy storage module that stores electrical energy on an electrochemical basis, wherein the at least one capacitor and the at least one energy storage module that stores electrical energy on an electrochemical basis have different rated voltages.

The energy storage modules of different types preferably comprise an energy storage module from the group comprising an energy storage module of the lithium-ion type, an energy storage module of the nickel-metal hydride type and an energy storage module of the $Pb/PbO_2$ type.

The energy storage modules of different types preferably comprise at least two energy storage modules from the group comprising an energy storage module of the lithium-ion type, an energy storage module of the nickel-metal hydride type and an energy storage module of the $Pb/PbO_2$ type.

The group of n energy storage modules therefore comprises, for example, at least one energy storage module of the nickel-metal hydride type with a rated voltage of 1.2 V combined with at least one energy storage module of the $Pb/PbO_2$ type with a rated voltage of 2 V or combined with at least one energy storage module of the lithium-ion type. As an alternative, the group of n energy storage modules can also comprise at least one energy storage module of each of the three mentioned types or at least one energy storage module of the $Pb/PbO_2$ type combined with at least one energy storage module of the lithium-ion type.

The energy storage modules of different types comprise at least one energy storage module from the group comprising an energy storage module with a cathode based on LFP, an energy storage module with a cathode based on NMC, an energy storage module with a cathode based on LTO and an energy storage module with a cathode based on NCA.

Particularly preferably, the method has at least one of the following additional features and/or one of the following additional steps:

At least one of the switches assigned to the n energy storage modules is able to generate a pulse-width modulation (PWM).

The energy storage module to which the switch is assigned is a capacitor or a cell of the lithium-ion type.

During activation and/or deactivation of energy storage modules, a PWM is generated by the switch designed to generate PWM to ease the transition between individual voltage levels.

Electromagnetic compatibility (EMC) is relatively simple to realize for battery storage systems in this example.

Two or more of the switches assigned to the n energy storage modules can be able to generate a pulse-width modulation (PWM). However, to realize the example, only one switch designed to generate PWM is required in principle. This is advantageous inasmuch as all of the further switches can be designed to be slower and more cost-effective. It is then possible to actuate the switch designed to generate PWM separately by a comparatively quick bus system whereas a comparatively slow, common bus system is used to actuate the other switches. The actuation and construction of the battery storage system can therefore be kept very simple.

We also provide a battery management system having the features below and also a modular battery storage system having the features below. Particularly preferably, the battery management system has the following features:

A method operates a modular battery storage system comprising a group of n rechargeable energy storage modules, comprising assigning a switch to each individual n energy storage modules by which switch the respective energy storage module can be activated and deactivated, connecting the n energy storage modules to one another by the switches such that individual voltages $U_{individual}$ of activated energy storage modules can be added up to form a total voltage $U_{total}$, wherein a group of n energy storage modules comprises energy storage modules of different types, ascertaining at least one power value for each of the n energy storage modules, producing a total voltage $U_{tot}(t)$ that changes over time by at least two energy storage modules from the group being activated with a time overlap, but over activation periods of different length, and assigning one of the activation periods of different length to each of the at least two energy storage modules depending on the ascertained at least one power value, further comprising at least one of a power threshold value is defined for each of the n energy storage modules, an energy storage module deactivated when the power threshold value is undershot, a signal or a message suggesting the deactivation is triggered when the power threshold value is undershot, the deactivated energy storage module is bridged so that it no longer electrically connects to further energy storage modules, and the deactivated energy storage module is replaced.

Particularly preferably, the modular battery storage system has the following features:

A battery management system for a modular battery storage system comprises a group of n rechargeable energy storage modules, comprising a switch for each of individual n energy storage modules by which switch the respective energy storage module can be activated and deactivated, wherein the switches are designed and connected to one another such that individual voltages $U_{individual}$ of activated energy storage modules can be added up to form a total voltage $U_{total}$, a test device by which at least one power value can be ascertained for each of the n energy storage modules, the power value being characteristic of the power capacity of the energy storage module, and a control device by which at least two of the energy storage modules from the group can be activated with a time overlap but over activation periods of different length by the respectively associated switches to generate a total voltage $U_{tot}(t)$ which changes over time, wherein the control device assigns one of the activation periods of different length to each of the at least two energy storage modules depending on the ascertained at least one power value, further comprising at least one of the switches assigned to the n energy storage modules is able to generate a pulse-width modulation (PWM), the energy storage module to which the switch is assigned is a capacitor, and the control device, during activation and/or deactivation of energy storage modules, generates a PWM by the switch that generates PWM to ease the transition between individual voltage levels.

The battery management system is provided for a modular battery storage system comprising a group of n rechargeable energy storage modules. The battery management system is particularly preferably part of a battery storage system as described in the above explanation of the method. The battery management system is distinguished by the following features:

The battery management system comprises a switch for each of the individual n energy storage modules, by which switch the respective energy storage module can be activated and deactivated.

The switches are designed and connected to one another such that the individual voltages $U_{individual}$ of activated energy storage modules can be added up to form a total voltage $U_{total}$.

The battery management system comprises a test device by which at least one power value can be ascertained for each of the n energy storage modules, the power value being characteristic of the power capacity of the energy storage module.

The battery management system comprises a control device by which at least two of the energy storage modules from the group comprising the n rechargeable energy storage modules can be activated with a time overlap but over activation periods of different length by the respectively associated switches to generate a total voltage $U_{tot}(t)$ that changes over time.

The control device can assign one of the activation periods of different length to each of the at least two energy storage modules depending on the ascertained at least one power value.

In line with the above relating to the method, the battery management system preferably has at least one of the following additional features:

It comprises a data memory in which the ascertained power values for each of the n energy storage modules can be stored so that it is possible to sort the n energy storage modules in accordance with their power capacity.

The control device can perform the assignment of the energy storage modules to the activation periods of different length on the basis of the power values stored in the data memory.

Likewise in line with the above relating to the method, the battery management system particularly preferably has at least one of the following additional features:

The control device can ascertain the number m of energy storage modules required to generate a peak voltage of $U_{tot}(t)$ in an automated manner The control device can select the m energy storage modules from among the available n energy storage modules in an automated manner The battery management system comprises a data memory in which it is possible to store the time intervals in which and the activation period over which the m energy storage modules are to be activated.

The control device can switch the selected m energy storage modules into an order in which the two sorting criteria either both increase or both decrease in the same direction, taking into account the sorting criteria "power capacity" and "length of the activation periods assigned to them", in an automated manner.

The control device can activate the m energy storage modules in this order and at the defined time intervals.

The battery management system is particularly preferably additionally distinguished by at least one of the following features:

At least one of the switches assigned to the n energy storage modules can generate a pulse-width modulation (PWM).

The control unit can, during activation and/or deactivation of energy storage modules, generate a PWM by the switch that can generate PWM to ease the transition between individual voltage levels.

Possible preferred examples of the battery management system can be found above relating to the method.

The modular battery storage system always comprises the following components:

A group of n rechargeable energy storage modules.

A battery management system.

The energy storage modules are preferably those having already been described in connection with the method. The battery management system is the system described directly above.

The battery storage system is preferably designed to be operated in accordance with the above-described method.

The battery storage system particularly preferably has at least one of the following additional features:

The group of the n energy storage modules comprises only energy storage modules of the lithium-ion type.

The group of the n energy storage modules comprises only energy storage modules of the nickel-metal hydride type.

The group of the n energy storage modules comprises different types of energy storage modules.

The group of the n energy storage modules comprises at least one energy storage module with a cathode based on LFP (lithium iron phosphate).

The group of the n energy storage modules comprises at least one energy storage module with a cathode based on NMC (lithium nickel manganese cobalt oxide).

The group of the n energy storage modules comprises at least one energy storage module with a cathode based on LTO (lithium titanate).

The group of the n energy storage modules comprises at least one energy storage module with a cathode based on NCA (lithium nickel cobalt aluminum oxide).

The group of the n energy storage modules comprises at least one energy storage module of the $Pb/PbO_2$ type.

The modular battery storage system particularly preferably has at least one of the following features:

The energy storage modules of different types preferably have different individual voltages $U_{individual}$.

The energy storage modules of different types preferably comprise at least one energy storage module which is a capacitor.

The energy storage modules of different types preferably comprise at least two energy storage modules with different rated voltages, each of the energy storage modules being a capacitor.

The energy storage modules of different types preferably comprise at least one energy storage module that stores electrical energy on an electrochemical basis.

The energy storage modules of different types preferably comprise at least two energy storage modules that store electrical energy on an electrochemical basis and differ from one another in respect of their rated voltage.

The energy storage modules of different types preferably comprise at least one energy storage module that is a capacitor and at least one energy storage module that stores electrical energy on an electrochemical basis, wherein the at least one capacitor and the at least one energy storage module that stores electrical energy on an electrochemical basis have different rated voltages.

The energy storage modules of different types preferably comprise an energy storage module from the group comprising an energy storage module of the lithium-ion type, an energy storage module of the nickel-metal hydride type and an energy storage module of the $Pb/PbO_2$ type.

The energy storage modules of different types preferably comprise at least two energy storage modules from the group comprising an energy storage module of the lithium-ion type, an energy storage module of the nickel-metal hydride type and an energy storage module of the $Pb/PbO_2$ type.

The energy storage modules of different types comprise at least one energy storage module from the group comprising an energy storage module with a cathode based on LFP, an energy storage module with a cathode based on NMC, an energy storage module with a cathode based on LTO and an energy storage module with a cathode based on NCA.

Further possible preferred examples of the battery storage system can be found above relating to the method and relating to the battery management system.

Further features, details and advantages are found in the appended claims and abstract, the wording of both being included in the content of the description by reference, the following description of preferred examples and with reference to the drawings.

FIG. 1 shows a simplified example of a battery storage system comprising n rechargeable energy storage modules $B1$ to $B_n$ and n switches $S1$ to $S_n$. Each of the switches is assigned to precisely one of the energy storage modules and vice versa (S1 to B1, S2 to B2, S3 to B3, S4 to B4 and $S_n$ to $B_n$). The respective energy storage modules can be activated and deactivated by the switches. Each of the switches can have a plurality of switching positions. In a first switching position, the energy storage module assigned to the switch is activated and its individual voltage $U_{individual}$ is available. In a second switching position, the energy storage module assigned to the switch is deactivated and its individual voltage $U_{individual}$ is not available. In a third switching position, the energy storage module assigned to the switch is activated with a reverse polarity. All of the switches can bridge the energy storage modules respectively associated with them in the event of deactivation (in the second switching position). Deactivated energy storage modules can therefore be replaced while operation is ongoing.

The switches are, for their part, connected in series. The n energy storage modules can connect to one another by the switches such that the individual voltages $U_{individual}$ of activated energy storage modules can be added up to form a total voltage $U_{total}$. If one of the switches is in the second switching position, it bridges the deactivated energy storage module assigned to it. If one of the switches is in the third switching position, the individual voltage $U_{individual}$ of the energy storage module assigned to it makes a negative contribution to the total voltage $U_{total}$.

The total voltage $U_{total}$ can be increased in stages by successive serial interconnection of the n energy storage modules. The following table shows possible ways to generate a series of total voltages $U_{total}$ with the aid of four energy storage modules with different individual voltages $U_{individual}$ and the associated switches 1 to 4. The state of bridging of an energy storage module is indicated by the numeral 0 in the table, and an energy storage module which is activated with regular polarity is identified by 1.

| Switch no./Individual voltage | | | | |
|---|---|---|---|---|
| S1/50 V | S2/40 V | S3/48 V | S4/54 V | $U_{total}$ |
| 0 | 0 | 0 | 0 | 0 V |
| 1 | 0 | 0 | 0 | 50 V |
| 1 | 1 | 0 | 0 | 90 V |
| 1 | 0 | 1 | 0 | 98 V |
| 1 | 0 | 0 | 1 | 104 V |
| 0 | 1 | 1 | 0 | 88 V |

Figure 2:
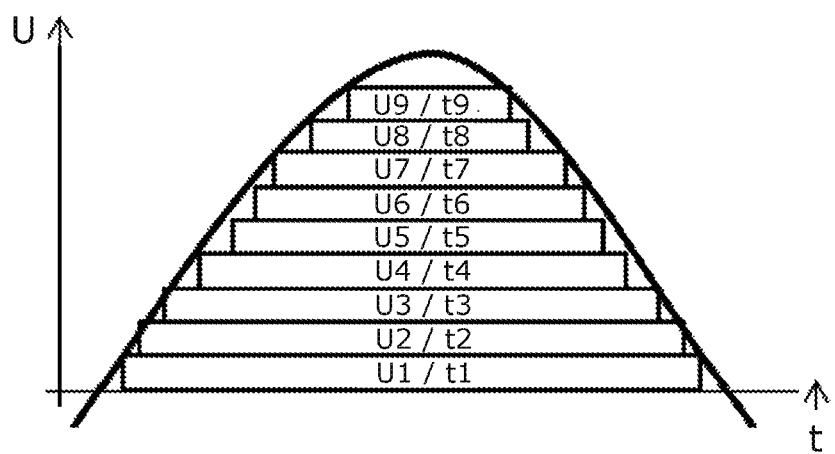
FIG. 2 is a schematic illustration showing a sinusoidal half-wave produced by overlapping activation of energy storage modules interconnected in accordance with FIG. 1.

The functioning of the method is explained with reference to FIG. 2. That figure shows an approximately sinusoidal half-wave generated by overlapping activation of energy storage modules which are interconnected according to FIG. 1. For reasons of simplicity, it is assumed that each of the energy storage modules delivers the same individual voltage $U_{individual}$, wherein this in no way necessarily has to be true, as illustrated above. To generate the half-wave, 9 energy storage modules B1 to B9 connect to one another in series, wherein:

B1 delivers the individual voltage U1 over the activation period t1,

B2 delivers the individual voltage U2 over the activation period t2,

B3 delivers the individual voltage U3 over the activation period t3,

B4 delivers the individual voltage U4 over the activation period t4,

B5 delivers the individual voltage U5 over the activation period t5,

B6 delivers the individual voltage U6 over the activation period t6,

B7 delivers the individual voltage U7 over the activation period t7,

B8 delivers the individual voltage U8 over the activation period t8,

B9 delivers the individual voltage U9 over the activation period t9, and

U1=U2=U3=U4=U5=U6=U7=U8=U9 and t1>t2 and t2>t3 and t3>t4 and t4>t5 and t5>t6 and t6>t7 and t7>t8 and t8>t9.

The energy storage modules B1 to B9 are activated with a time delay in the order of their numbering and deactivated with a time delay in the reverse order. During activation, the total voltage $U_{total}$ increases in stages until the desired peak value is reached, and the total voltage is then lowered in stages. The shape of the sinusoidal curve is given—apart from the peak value—by the time intervals in which the energy storage modules are activated and deactivated and by the respective activation periods (the periods between activation and deactivation of an energy storage module). To generate a desired sinusoidal shape, the time intervals in which and the activation period over which the m energy storage modules are to be activated are therefore defined.

Preferably, a power value is determined for each of the 9 energy storage modules, the power value being characteristic of the power capacity of the energy storage module, for example, an internal resistance from which conclusions can be drawn about the SOH of the respective energy storage module. The 9 energy storage modules can then be sorted in accordance with their power capacity, and the defined activation periods can be sorted in accordance with their length. The activation periods are then assigned to the 9 energy storage modules. In this example, the assignment takes place such that, after the assignment, sorting of the energy storage modules in accordance with their power capacity and in accordance with the length of the activation periods assigned to them leads to the same result. Therefore, when sorting in accordance with increasing power capacity, an order in which the longest activation period is assigned to the most powerful module, the second longest activation period is assigned to the second most powerful module, the third longest activation period is assigned to the third most powerful module or the like is produced.

In this example, this means that the energy storage module B1 had been identified as the energy storage module with the highest power capacity and was therefore assigned the longest activation period. B9 was identified as the energy storage module with the lowest power capacity and was assigned the shortest activation period.

Figure 3:
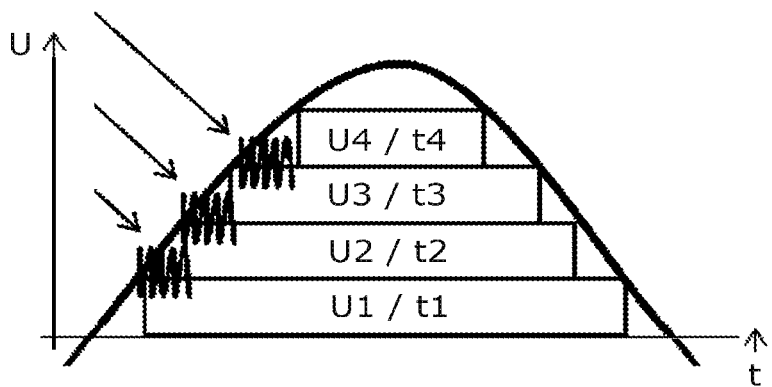
FIG. 3 shows the use of a pulse-width modulation.

When generating voltage curves, pulse-width control can be used at the transition between the voltage levels generated by switching on or switching off energy storage modules to make the transitions more gentle. This is explained in FIG. 3 as shown by the arrows on the left-hand side that indicate the pulse-width processes.

The invention claimed is:

1. A method of operating a modular battery storage system comprising a group of n rechargeable energy storage modules, comprising:

assigning a switch to each individual n energy storage modules by which switch the respective energy storage module can be activated and deactivated, connecting the n energy storage modules to one another by the switches such that individual voltages $U_{individual}$ of activated energy storage modules can be added up to form a total voltage $U_{total}$, wherein a group of n energy storage modules comprises energy storage modules of different types, ascertaining at least one power value for each of the n energy storage modules, producing a total voltage $U_{tot}(t)$ that changes over time by at least two energy storage modules from the group being activated with a time overlap, but over activation periods of different length, and assigning one of the activation periods of different length to each of the at least two energy storage modules depending on the ascertained at least one power value.

2. The method as claimed in claim 1, further comprising:

storing ascertained power values for each of the n energy storage modules in a data memory so that it is possible to sort the n energy storage modules in accordance with their power capacity, wherein assignment of the energy storage modules to the activation periods of different length takes place on the basis of the power values are stored in the data memory, and assigning longer activation periods to energy storage modules with a comparatively high power capacity than energy storage modules with a comparatively low power capacity.

3. The method as claimed in claim 1, further comprising:

ascertaining the number m of energy storage modules is required to generate a peak voltage of $U_{tot}(t)$, selecting the m energy storage modules from among available n energy storage modules, defining the time intervals in which and an activation period over which the m energy storage modules are to be activated to generate a desired voltage profile of $U_{tot}(t)$, switching selected m energy storage modules into an order in which two sorting criteria either both increase or both decrease in the same direction, taking into account the sorting criteria power capacity and length of the activation periods assigned to them, and activating the m energy storage modules in this order and at the defined time intervals.

4. The method as claimed in claim 3, wherein the desired voltage profile is sinusoidal, the energy storage module with the highest power capacity is activated first and that with the lowest power capacity is activated last, and the energy storage module with the highest power capacity is activated over the longest activation period and the energy storage module with the lowest power capacity is activated over the shortest activation period.

5. The method as claimed in claim 4, further comprising at least one of:

the energy storage modules of different types have different individual voltages $U_{individual}$, the energy storage modules of different types comprise at least one energy storage module which is a capacitor, the energy storage modules of different types comprise at least two energy storage modules with different rated voltages, each of said energy storage modules being a capacitor, the energy storage modules of different types comprise at least one energy storage module that stores electrical energy on an electrochemical basis, the energy storage modules of different types comprise at least two energy storage modules that store electrical energy on an electrochemical basis and differ from one another in respect of their rated voltage, the energy storage modules of different types comprise at least one energy storage module which is a capacitor and at least one energy storage module that stores electrical energy on an electrochemical basis, wherein the at least one capacitor and the at least one energy storage module that stores electrical energy on an electrochemical basis have different rated voltages, the energy storage modules of different types comprise an energy storage module selected from the group consisting of an energy storage module of the lithium-ion type, an energy storage module of the nickel-metal hydride type and an energy storage module of the $Pb/PbO_2$ type, the energy storage modules of different types comprise at least two energy storage modules selected from the group consisting of an energy storage module of the lithium-ion type, an energy storage module of the nickel-metal hydride type and an energy storage module of the $Pb/PbO_2$ type, and the energy storage modules of different types comprise at least one energy storage module selected from the group consisting of an energy storage module with a cathode based on LFP, an energy storage module with a cathode based on NMC, an energy storage module with a cathode based on LTO and an energy storage module with a cathode based on NCA.

6. The method as claimed in claim 1, further comprising at least one of:

one of the switches is assigned to the n energy storage modules is able to generate a pulse-width modulation (PWM), the energy storage module to which said switch is assigned is a capacitor, and during activation and/or deactivation of energy storage modules, a PWM is generated by the switch that generates PWM to ease the transition between individual voltage levels.

7. The method according to claim 1, further comprising at least one of:

a power threshold value is defined for each of the n energy storage modules, an energy storage module deactivated when said power threshold value is undershot, a signal or a message suggesting the deactivation is triggered when the power threshold value is undershot, the deactivated energy storage module is bridged so that it no longer electrically connects to further energy storage modules, and the deactivated energy storage module is replaced.

8. A battery management system for a modular battery storage system comprising a group of n rechargeable energy storage modules, comprising:

a switch for each of individual n energy storage modules by which switch the respective energy storage module can be activated and deactivated, wherein the switches are designed and connected to one another such that individual voltages $U_{individual}$ of activated energy storage modules can be added up to form a total voltage $U_{total}$, a test device by which at least one power value can be ascertained for each of the n energy storage modules, said power value being characteristic of the power capacity of said energy storage module, and a control device by which at least two of the energy storage modules from the group can be activated with a time overlap but over activation periods of different length by the respectively associated switches to generate a total voltage $U_{tot}(t)$ which changes over time, wherein the control device assigns one of the activation periods of different length to each of the at least two energy storage modules depending on the ascertained at least one power value.

9. The battery management system as claimed in claim 8, further comprising at least one of:

a data memory in which the ascertained power values for each of the n energy storage modules can be stored so that it is possible to sort the n energy storage modules in accordance with their power capacity, and the control device performs assignment of the energy storage modules to the activation periods of different length on the basis of the power values which are stored in the data memory.

10. The battery management system as claimed in claim 8, further comprising at least one of:

the control device ascertains the number m of energy storage modules required to generate a peak voltage of $U_{tot}(t)$ in an automated manner, the control device selects the m energy storage modules from among the available n energy storage modules in an automated manner, a data memory that stores the time intervals in which and the activation period over which the m energy storage modules are to be activated, the control device switches the selected m energy storage modules into an order in which the two sorting criteria either both increase or both decrease in the same direction by sorting, taking into account the sorting criteria power capacity and length of the activation periods assigned to them, in an automated manner, and the control device activates the m energy storage modules in this order and at the defined time intervals.

11. The battery management system as claimed in claim 8, further comprising at least one of:

one of the switches assigned to the n energy storage modules is able to generate a pulse-width modulation (PWM), the energy storage module to which said switch is assigned is a capacitor, and the control device, during activation and/or deactivation of energy storage modules, generates a PWM by the switch that generates PWM to ease the transition between individual voltage levels.

12. A modular battery storage system comprising a group of n rechargeable energy storage modules, comprising at least one of:

the group of n energy storage modules comprises energy storage modules of different types, the battery storage system comprises the battery management system as claimed in claim 8, the battery storage system operates in accordance with a method comprising a method of operating a modular battery storage system comprising a group of n rechargeable energy storage modules, comprising:

assigning a switch to each of individual n energy storage modules by which switch the respective energy storage module can be activated and deactivated, connecting the n energy storage modules to one another by the switches such that individual voltages $U_{individual}$ of activated energy storage modules can be added up to form a total voltage $U_{total}$, wherein a group of n energy storage modules comprises energy storage modules of different types, ascertaining at least one power value for each of the n energy storage modules, producing a total voltage $U_{tot}(t)$ that changes over time by at least two energy storage modules from the group being activated with a time overlap, but over activation periods of different length, and assigning one of the activation periods of different length to each of the at least two energy storage modules depending on the ascertained at least one power value.

13. The battery storage system as claimed in claim 12, further comprising at least one of:

the energy storage modules of different types have different individual voltages $U_{individual}$, the energy storage modules of different types comprise at least one energy storage module which is a capacitor, the energy storage modules of different types comprise at least two energy storage modules with different rated voltages, each of said energy storage modules being a capacitor, the energy storage modules of different types comprise at least one energy storage module that stores electrical energy on an electrochemical basis, the energy storage modules of different types comprise at least two energy storage modules that store electrical energy on an electrochemical basis and differ from one another in respect of their rated voltage, the energy storage modules of different types comprise at least one energy storage module which is a capacitor and at least one energy storage module that stores electrical energy on an electrochemical basis, wherein the at least one capacitor and the at least one energy storage module that stores electrical energy on an electrochemical basis have different rated voltages, the energy storage modules of different types comprise an energy storage module selected from the group consisting of an energy storage module of the lithium-ion type, an energy storage module of the nickel-metal hydride type and an energy storage module of the $Pb/PbO_2$ type, the energy storage modules of different types comprise at least two energy storage modules selected from the group consisting of an energy storage module of the lithium-ion type, an energy storage module of the nickel-metal hydride type and an energy storage module of the $Pb/PbO_2$ type, and the energy storage modules of different types comprise at least one energy storage module selected from the group consisting of an energy storage module with a cathode based on LFP, an energy storage module with a cathode based on NMC, an energy storage module with a cathode based on LTO and an energy storage module with a cathode based on NCA.

* * * * *